United States Patent
Eickhoff et al.

(10) Patent No.: US 8,614,022 B2
(45) Date of Patent: Dec. 24, 2013

(54) SOLID OXIDE FUEL CELL

(75) Inventors: Steven J. Eickhoff, Plymouth, MN (US); Chunbo Zhang, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1480 days.

(21) Appl. No.: 11/871,573

(22) Filed: Oct. 12, 2007

(65) Prior Publication Data

US 2009/0098419 A1    Apr. 16, 2009

(51) Int. Cl.
*H01M 8/04* (2006.01)

(52) U.S. Cl.
USPC .......................................... 429/413; 429/407

(58) Field of Classification Search
USPC .................. 429/413, 407, 400, 414, 433, 443
See application file for complete search history.

(56) References Cited

U.S. PATENT DOCUMENTS

| | | |
|---|---|---|
| 2005/0037245 A1 | 2/2005 | Pham |
| 2005/0196659 A1 | 9/2005 | Grieve et al. |
| 2006/0090397 A1 * | 5/2006 | Edlund et al. ..................... 48/61 |
| 2007/0026285 A1 * | 2/2007 | Wang et al. ........................ 429/33 |
| 2007/0166586 A1 * | 7/2007 | Marchand et al. ............... 429/25 |
| 2011/0286884 A1 * | 11/2011 | Eickhoff et al. ................ 422/54 |

FOREIGN PATENT DOCUMENTS

| | | |
|---|---|---|
| EP | 1675200 A2 | 6/2006 |
| WO | WO-2006041854 A2 | 4/2006 |

OTHER PUBLICATIONS

"United Kingdom Application Serial No. 0818681, Combined Search and Examination Report mailed Oct. 28, 2008", 4 pgs.

"United Kingdom Application Serial No. 0818681, Response filed Oct. 12, 2009 to Combined Search and Examination Report mailed Oct. 28, 2008", 3 pgs.

* cited by examiner

*Primary Examiner* — Mark F Huff
*Assistant Examiner* — Monique Wills
(74) *Attorney, Agent, or Firm* — Schwegman, Lundberg & Woessner, P.A.

(57) ABSTRACT

A power generator includes a hydrogen generator that generates hydrogen in response to water vapor. A solid oxide fuel cell is coupled to the hydrogen generator for receiving hydrogen and is coupled to a source of oxygen.

19 Claims, 3 Drawing Sheets

SOLID OXIDE FUEL CELL

BACKGROUND

Portable power sources such as batteries and some fuel cells have low energy density and specific energy. Because of this, they do not provide sufficient energy for a long period of time desired for many demanding portable applications.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
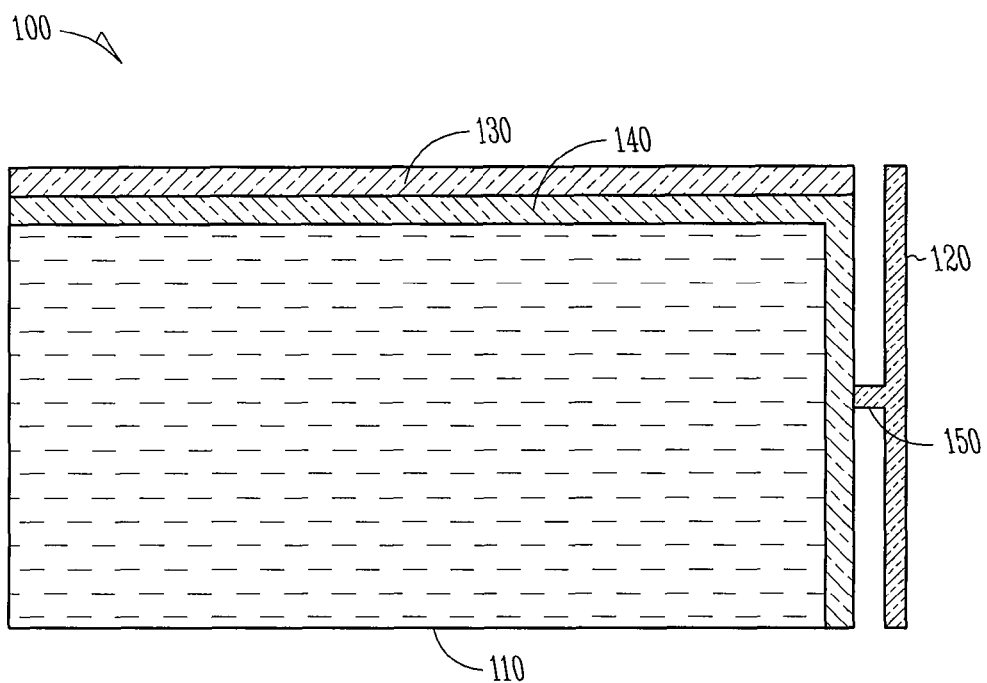
FIG. 1 is a block diagram of a power generator utilizing a solid oxide fuel cell according to an example embodiment.

A portable generator 100 is illustrated in block form in FIG. 1. Portable generator 100 is a weight and volume efficient water-scavenging hydrogen generator 110 coupled to a solid oxide fuel cell 120 to generate electrical power. In one embodiment, the hydrogen generator 110 comprises a material that generates hydrogen when exposed to water. In a further embodiment, it is desirable to provide water vapor to the hydrogen generator 110. Materials which may be used in the hydrogen generator 110 to generate hydrogen non-exclusively include alkali metals, calcium hydride, lithium hydride, lithium aluminum hydride, lithium borohydride, sodium borohydride and combinations thereof. Suitable alkali metals non-exclusively include lithium, sodium and potassium. When contacted with water molecules, these fuels react, releasing hydrogen gas. The fuel may optionally be combined with a hydrogen generation catalyst to catalyze the reaction of the water vapor and the non-fluid substance. Suitable catalysts may non-exclusively include cobalt, nickel, ruthenium, magnesium and alloys and combinations thereof.

Figure 3:
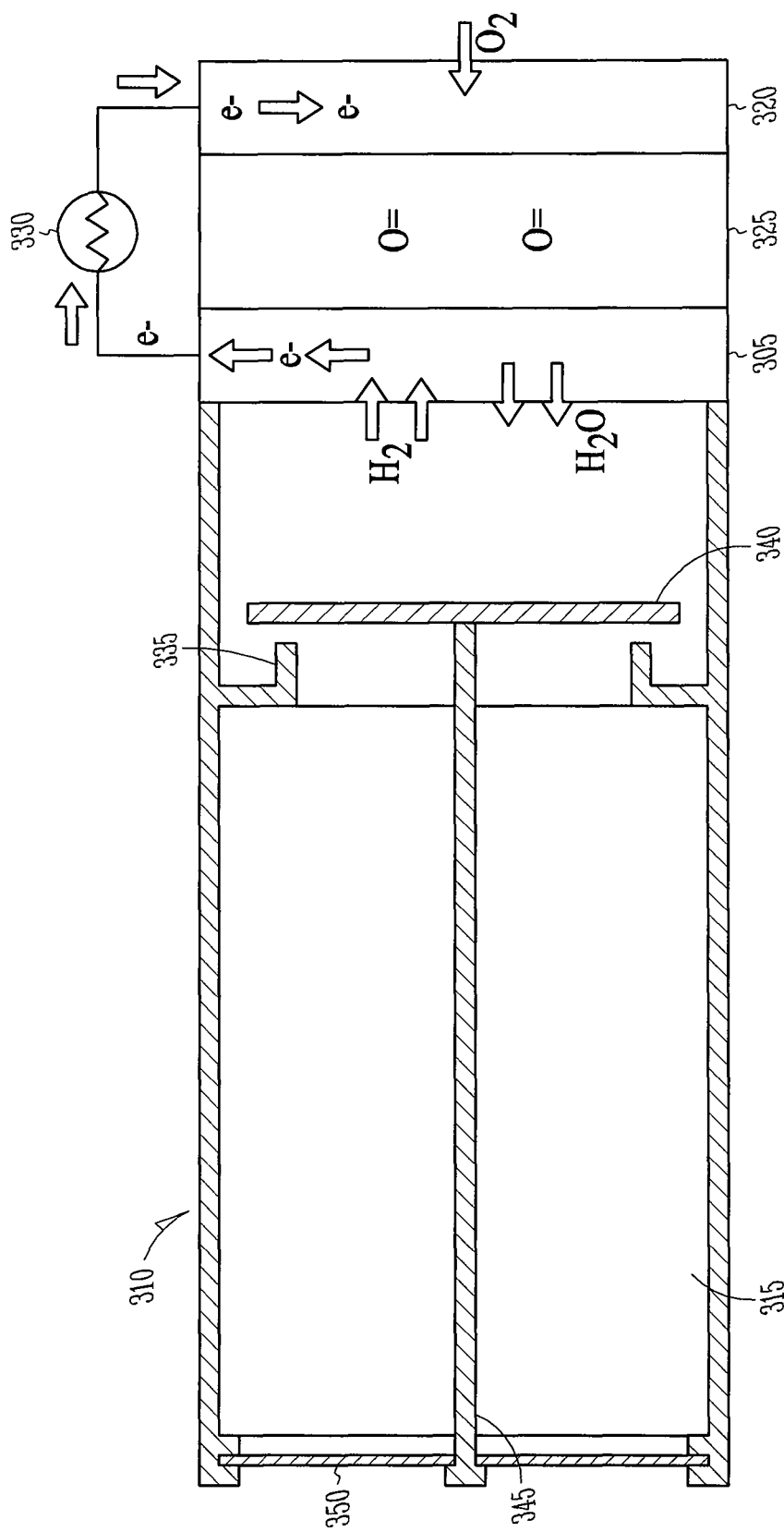
FIG. 3 is a block diagram of an alternative power generator utilizing a solid oxide fuel cell according to an example embodiment.

In one embodiment, a water vapor permeable, hydrogen impermeable membrane 130, such as Nafion is provided between the hydrogen generator and a water vapor source. In further embodiments, various valve arrangements may also be used to control the amount of water vapor supplied to the fuel material responsive to electrical demands placed on the power generator. The water vapor source may be self contained in the power generator (a liquid water source), it may comprise ambient humidity, or as illustrated in FIG. 3 at 300, the water vapor source is the water generated by the fuel cell.

A space 140 may be provided between the membrane 130 and the fuel material to allow for transport of generated hydrogen to the solid oxide fuel cell 120, such as via a passage 150. The hydrogen generator may include a container 160 in further embodiments to hold the fuel material and the membrane 130.

Figure 2:
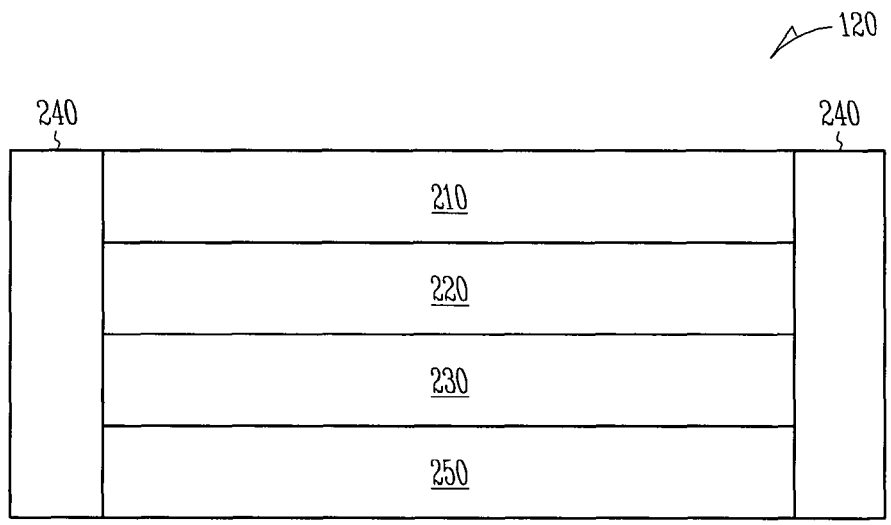
FIG. 2 is a block diagram of a cross section of an oxide fuel cell according to an example embodiment.

In one embodiment, the solid oxide fuel cell 120 is exposed to a source of oxygen, such as air. The solid oxide fuel cell 120 may be in the form of a stack made up of four layers in one embodiment. Three of the layers may be ceramic. A single cell consists of these four layers stacked together and is typically only a few millimeters thick. Hundreds of these layers may be stacked together in series to form the solid oxide fuel cell 120 as shown in further detail in FIG. 2. In some embodiments, the ceramics used become electrically and ionically active when they reach a high temperature, such as 700 to 1200° C.

To reach operating temperature, some of the hydrogen may be "burned" on a catalyst on the exterior of the fuel cell with oxygen from ambient, generating heat. Other heating methods may be employed, such as employing a small rechargeable battery that ohmically heats a wire wrapped around the solid oxide fuel cell. Still other methods of generating heat may be used, such as utilizing heat produced by a load coupled to the power generator.

A cathode layer 210 of the solid oxide fuel cell 120 is porous in one embodiment, such that is allows air flow through it and into an electrolyte. The ceramic materials used for the cathode layer 210 are electrically conductive in one embodiment. The cathode layer 210 is a positive side of the fuel cell. Electrons flow toward the cathode. The electrons are used to reduce oxygen molecules to oxygen ions.

An electrolyte 220 is a dense gas tight layer of each cell 120 that acts as a membrane separating the air on the cathode layer 210 from the fuel on an anode layer 230 side. There are many ceramic materials that may be used as an electrolyte. Some common electrolyte materials include zirconium oxide based materials. Besides being air tight, the electrolyte may also be electrically insulating so that the electrons resulting form the oxidation reaction on the anode layer 230 side are forced to travel though an external circuit before reaching the cathode layer 210 side. The electrolyte 220 in one embodiment conducts the oxygen ions from the cathode to the anode. Ionic conductivity is a desirable attribute in selecting a suitable electrolyte.

The ceramic anode layer 230 is very porous in one embodiment such that it allows the hydrogen to flow to the electrolyte. Like the cathode 210, it conducts electricity. One common material for the ceramic anode layer 230 is a cermet made up of nickel mixed with the ceramic material that is used for the electrolyte. The anode is commonly the thickest and strongest layer in each individual cell, and is often a layer that provides mechanical support for the other layers. The anode uses the oxygen ions that diffuse through the electrolyte layer to oxidize the hydrogen fuel. The oxidation reaction between the oxygen ions and the hydrogen produces both water and electricity.

An interconnect 240 may be either a metallic or a ceramic layer that sits between each individual cell. It provides electrically connection of the cells in series. The interconnect in one embodiment is a highly corrosion resistant conductive material, such as gold or some forms of ceramics in various embodiments.

In one embodiment, the water produced by the oxidation reaction between the oxygen ions and the hydrogen is used as a source of water vapor for the hydrogen generator. In one embodiment, a water vapor permeable, hydrogen permeable and liquid water impermeable membrane 250 may be used between the fuel cell and the hydrogen generator together with a pressure controlled valve to control the amount of water vapor provided to the fuel. The membrane 250 in one embodiment is a micro-porous polymeric film. Such polymeric films non-exclusively include mono- and multilayer fluoropolymer containing materials, a polyurethane containing materials, polyester containing materials or polypropylene containing materials. Suitable fluoropolymer containing materials include polytetrafluoroethylene (PTFE) and expanded polytetrafluoroethylene (ePTFE), PFA, FEP. Example fluoropolymer containing materials are films and fabrics commercially available under the Gore-Tex®, eVent® and HyVent® trademarks. Gore-Tex® is an e-PTFE material commercially available from W.L. Gore and Associates of Newark, Del., and eVENT® is a PTFE material manufactured by BHA technologies of Delaware. HyVent® is polyurethane containing material commercially available from The North Face Apparel Corp., of Wilmington, Del.

In an alternative power generator incorporating a solid oxide fuel cell as shown at 300 in FIG. 3, water is generated at an anode 305 (unlike in a PEM (proton exchange membrane) fuel cell, where water is generated at the cathode) and can be used to generate hydrogen by diffusing back to a hydrogen generator 310 and reacting with a hydride fuel 315. This is a significant advantage over PEM fuel cells that use water generated at the fuel cell cathode to generate hydrogen, because in the PEM cell, the water vapor must permeate either through the fuel cell PEM membrane or through some other water vapor permeable membrane before it can react with the hydride fuel. This makes the power output of the PEM fuel cell sensitive to ambient humidity (because the ambient humidity affects the amount of water vapor which permeates back to the hydrogen generator), which is undesirable. Additionally, In the power generator incorporating the solid oxide fuel cell 300, power density is much greater than the PEM cell, making for a more compact high-power power source.

In various example embodiments, the hydrogen fuel 315 may comprise a chemical hydride fuel or chemical hydride/metal hydride mixture to provide sufficient hydrogen for pulses of current that may be needed above a steady state supply that may be provided by solely using a chemical hydride fuel.

In power generator 300, a cathode 320 is exposed to a source of oxygen, such as ambient air or an oxygen supply. An electrolyte 325 separates the cathode 320 from the anode 305. Oxygen atoms move through the electrolyte 325 and combine with hydrogen from the hydrogen generator 310, generating electrons, which may flow back to the cathode 320 through a load indicated at 330.

The hydrogen generator 310 in one embodiment has a valve seat 335 that mates with a valve disc 340. In this embodiment, the valve disc 340 moves transverse to an axis of the fuel cell 300, selectively allowing generated hydrogen to be provided to the anode 305. The valve plate is coupled via a valve pin 345 to a pressure responsive flexible diaphragm 350. As hydrogen is consumed in response to demand from load 330, a difference in pressure may develop across the pressure responsive diaphragm 350. The diaphragm 350 flexes toward the valve seat 335, releasing the valve disc 340 from the seat and allowing water vapor to be transported to the hydrogen generator 310, which in turn generates hydrogen that is transported to the solid oxide fuel cell. As sufficient hydrogen is generated, the pressure difference across the diaphragm 350 equalizes, causing the valve disc 340 to move back towards the valve seat. This results in a self regulating power generator.

In one embodiment, a water vapor permeable, hydrogen permeable and liquid water impermeable membrane may be used between the fuel cell and the hydrogen generator together with a pressure controlled valve to control the amount of water vapor provided to the fuel. The membrane may be adjacent the fuel or adjacent the anode 305 as indicated at 250 in FIG. 2. In further embodiments, the membrane may be positioned somewhere between the anode 305 and fuel 315 to prevent liquid water from reaching the fuel 315.

Figure 4:
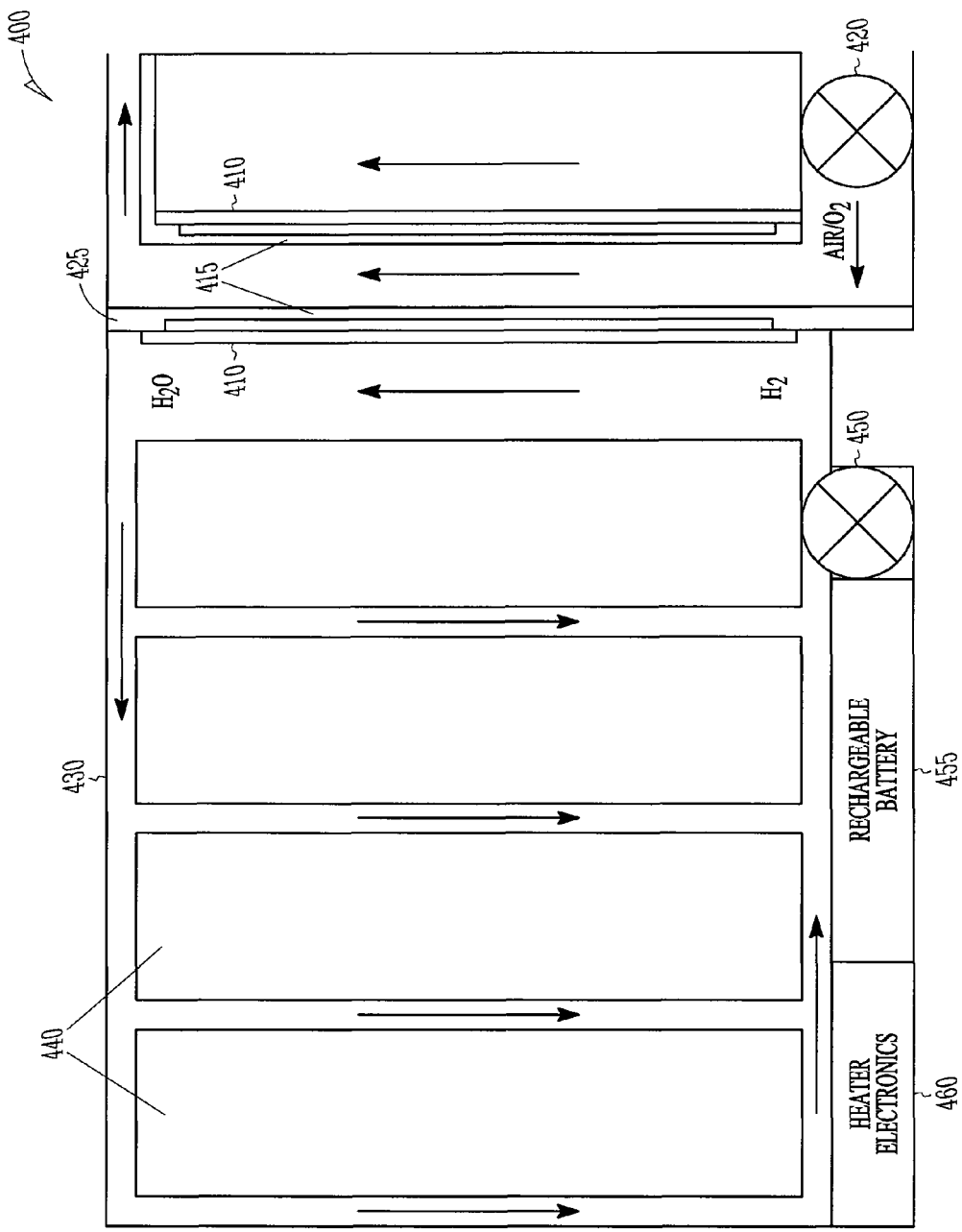
FIG. 4 is a block cross section representation of a further embodiment of a power generator utilizing a solid oxide fuel cell.

FIG. 4 is a block cross section representation of a further embodiment of an active system power generator 400 utilizing a solid oxide fuel cell 410. In one embodiment, solid-oxide fuel cell 410 is cylindrical in shape, with two sides illustrated by reference number 410 shown in FIG. 4. A heater 415 may be coaxially disposed with the fuel cell 410. A fan or pump 420 may be coupled to a source of air or oxygen, and provides for airflow through the tubular shaped fuel cell 410. Oxygen is provided inside the tubular shaped fuel cell 410 to a cathode, and hydrogen is provided on an outside of the tube to an anode. The fuel cell may take other shapes, such as triangular, cylindrical, square, parallel plates, or any other desired shape that allows separation of the anode and cathode to different gas supplies.

The heater 415 is thermally coupled to the fuel cell 410 and serves to heat the air and fuel cell to a desired operating temperature for operation of the solid oxide fuel cell 410. The heater and fuel cell may be mounted on a thermal insulating substrate indicated at 425 in one embodiment, which may in turn be coupled to a container 430 of the power generator 400. In one embodiment several such fuel cell/heater tubes are provided within the power generator, and may be electrically coupled in series or parallel to provide desired output signal levels.

A hydrogen fuel stack 440 is supported within container 430. In one embodiment, the hydrogen fuel stack 440 is formed of a chemical hydride, metal hydride, or other source of hydrogen. The fuel stack may be provided with passages to allow the flow of water vapor and hydrogen within the fuel stack, as well as to and from an anode side of the fuel cell 410. A further pump or fan 450 may be provided to facilitate such flow. In one embodiment, a rechargeable battery 455 may be provided, and may be electrically coupled to the anode and cathode of the fuel cell 410 in order to be recharged. The battery may also be coupled to electronics 460 and to the heater 415 for increasing the temperature of the fuel cell to operating levels during startup. The battery may also be coupled to the fuel cell 410 for being recharged.

In one embodiment, a method of operating a power generator includes heating a solid oxide fuel cell to an operating temperature of at least about 700° C., producing hydrogen from a hydride fuel source by exposing the fuel source to water vapor, combining the hydrogen with oxygen ions in the solid oxide fuel cell to produce water vapor and electricity, and providing the produced water vapor to the hydride fuel source to produce more hydrogen. The solid oxide fuel cell may be heated using the heater proximate the solid oxide fuel cell powered via the battery during startup, and by generated electricity during operation of the power generator.

In one embodiment, oxygen is blown past a cathode of the solid oxide fuel cell and hydrogen and water vapor are blown about the hydride fuel source and an anode of the solid oxide fuel cell.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A power generator comprising:
   a hydrogen generator that generates hydrogen in response to water vapor;
   a solid oxide fuel cell disposed on the hydrogen generator for receiving hydrogen and coupled to a source of oxygen wherein the solid oxide fuel cell generates water vapor at the anode of the solid oxide fuel cell and provides it to the hydrogen generator;
   a water vapor permeable, hydrogen permeable, and liquid water impermeable membrane located between the solid oxide fuel cell and the hydrogen generator, wherein the membrane allows passage of water vapor and hydrogen between the solid oxide fuel cell and the hydrogen generator and prevents passage of liquid water between the solid oxide fuel cell and the hydrogen generator; and
   a pressure controlled valve.

2. The power generator of claim 1 wherein the pressure controlled valve regulates water vapor supplied to the hydrogen generator.

3. The power generator of claim 1 and further comprising a water vapor permeable, hydrogen impermeable membrane disposed between the hydrogen generator and a water vapor source.

4. The power generator of claim 1 wherein the hydrogen generator comprises a hydride.

5. The power generator of claim 1 wherein the hydrogen generator contains at least one material selected from the group consisting of alkali metals, calcium hydride, lithium hydride, lithium aluminum hydride, lithium borohydride, sodium borohydride and combinations thereof.

6. The power generator of claim 1 wherein the solid oxide fuel cell comprises:
   a porous and electrically conductive ceramic containing cathode;
   a porous and electrically conductive ceramic containing anode; and
   an electrolyte layer disposed between the cathode and the anode.

7. The power generator of claim 6 wherein the electrolyte layer is a gas tight layer separating air on the cathode side from the fuel on the anode side.

8. The power generator of claim 6 wherein the electrolyte layer is electrically insulating and ionically conductive.

9. The power generator of claim 6 wherein the electrolyte layer includes a zirconium oxide based material.

10. The power generator of claim 6 wherein the electrolyte layer includes a ceramic material and wherein the anode includes nickel mixed with ceramic material.

11. The power generator of claim 6 wherein the anode provides mechanical support for the electrolyte and cathode.

12. The power generator of claim 6 and further comprising a heater thermally coupled to the solid oxide fuel cell.

13. The power generator of claim 12 and further comprising a battery coupled to the heater.

14. The power generator of claim 13 and further comprising a first fan coupled that circulates oxygen about the cathode, and a second fan that circulates hydrogen and water vapor about the anode and through the hydrogen generator.

15. A power generator comprising:
   means for generating hydrogen in response to water vapor;
   means for allowing water vapor to reach the means for generating hydrogen;
   a solid oxide fuel cell disposed on the hydrogen generator for receiving hydrogen from the means for generating hydrogen, and coupled to a source of oxygen, wherein the solid oxide fuel cell generates water vapor at the anode of the solid oxide fuel cell used by the means for generating hydrogen;
   a water vapor permeable, hydrogen permeable, and liquid water impermeable membrane located between the solid oxide fuel cell and the hydrogen generator, wherein the membrane allows passage of water vapor and hydrogen between the solid oxide fuel cell and the hydrogen generator and prevents passage of liquid water between the solid oxide fuel cell and the hydrogen generator; and
   a pressure controlled valve.

16. The power generator of claim 15 wherein the solid oxide fuel cell comprises:
   a ceramic containing cathode;
   a ceramic containing cathode; and
   an electrolyte layer disposed between the cathode and the anode.

17. The power generator of claim 16 wherein the cathode and the anode are porous and electrically conductive, and wherein the anode provides mechanical support for the fuel cell.

18. The power generator of claim 17 wherein the electrolyte layer is a gas tight layer separating air on the cathode side from the fuel on the anode side and wherein the electrolyte layer is electrically insulating, ionically conductive and includes a zirconium oxide based material.

19. The power generator of claim 16 and further comprising means for regulating the flow of water vapor to the means for generating hydrogen.

* * * * *